United States Patent
Iizaka et al.

(10) Patent No.: US 7,913,909 B2
(45) Date of Patent: Mar. 29, 2011

(54) POINT OF SALE DATACODE READING APPARATUS AND REAL-TIME DISPLAY

(75) Inventors: Hitoshi Iizaka, Shizuoka (JP); Yoshiya Yamada, Shizuoka (JP); Hidemi Mihara, Shizuoka (JP); Osamu Tsuchiya, Shizuoka (JP); Hidehiro Naitou, Tokyo (JP)

(73) Assignee: Toshiba Tec Kabushiki Kaisha (JP)

( * ) Notice: Subject to any disclaimer, the term of this patent is extended or adjusted under 35 U.S.C. 154(b) by 6 days.

(21) Appl. No.: 12/358,728

(22) Filed: Jan. 23, 2009

(65) Prior Publication Data

US 2009/0188981 A1    Jul. 30, 2009

(30) Foreign Application Priority Data

Jan. 24, 2008    (JP) ................................. 2008-013953

(51) Int. Cl.
*G06K 7/10* (2006.01)
*G06K 7/00* (2006.01)
(52) U.S. Cl. ......................... 235/454; 235/435; 235/439
(58) Field of Classification Search .................. 235/435, 235/439, 454, 462.41
See application file for complete search history.

(56) References Cited

U.S. PATENT DOCUMENTS

| 5,821,523 | A   | * | 10/1998 | Bunte et al. | ............. | 235/472.01 |
| 7,529,687 | B1  | * | 5/2009  | Phan | ............................... | 705/20 |
| 2004/0016814 | A1 | * | 1/2004 | Muramatsu | ............. | 235/462.41 |
| 2004/0059634 | A1 | * | 3/2004 | Tami et al. | ..................... | 705/17 |
| 2006/0043193 | A1 | * | 3/2006 | Brock | ..................... | 235/462.41 |

FOREIGN PATENT DOCUMENTS

| JP | 5-006484 | 1/1993 |
| JP | 9-185695 | 7/1997 |
| JP | 2001-014419 | 1/2001 |
| JP | 2006-277198 | 10/2006 |

* cited by examiner

*Primary Examiner* — Daniel A Hess
*Assistant Examiner* — Matthew Mikels
(74) *Attorney, Agent, or Firm* — Harness, Dickey & Pierce, P.L.C.

(57) ABSTRACT

Moving image data output from an image sensing device is input. An image display output unit processes the moving image data and displays it on the display screen of a display as a real-time moving image. A decode processing notification unit displays the moving image data output from the image sensing device on the display screen of the display as a still image for a predetermined time from decoding of the datacode by a decoding unit.

17 Claims, 3 Drawing Sheets

POINT OF SALE DATACODE READING APPARATUS AND REAL-TIME DISPLAY

CROSS-REFERENCE TO RELATED APPLICATIONS

This application is based upon and claims the benefit of priority from the prior Japanese Patent Application No. 2008-013953, filed Jan. 24, 2008, the entire contents of which are incorporated herein by reference.

TECHNICAL FIELD

The present invention relates to a datacode reading apparatus for reading a datacode such as a barcode attached to an item of merchandise.

BACKGROUND

In a store such as a supermarket or a convenience store, checkout is carried out to receive payment for purchases. In the checkout, a datacode reading apparatus is used to read datacodes such as barcodes attached to items of merchandise. Popular datacode reading apparatuses employ a laser system which reads a datacode by scanning a laser beam.

The datacode reading apparatus using the laser system is installed at a checkout counter. At the checkout counter, an operator removes items of merchandise from a shopping basket one by one and directs each item of merchandise to the datacode reading apparatus so that a laser beam scans across a datacode attached to the item of merchandise, thereby registering each item of merchandise.

A technique associated with the datacode reading apparatus using the laser system is disclosed in, e.g., Jpn. Pat. Appln. KOKAI Publication No. 2006-277198. The apparatus disclosed in Jpn. Pat. Appln. KOKAI Publication No. 2006-277198 has an image sensing unit capable of adjusting a normal mode to read merchandise identification information such as a merchandise code pasted to each item of merchandise and a merchandise image sensing mode to sense the outer appearance of each item of merchandise. When a merchandise code is read, and merchandise registration information corresponding to the merchandise code is not registered in a file, a merchandise image sensed by the image sensing unit in correspondence with the merchandise code is additionally registered in a file together with the unit price.

The operator of the datacode reading apparatus cannot visually recognize the laser beam when operating the apparatus. Hence, the operator is trained to be able to reliably register an item of merchandise by directing it to the datacode reading apparatus so that the laser beam scans across the datacode attached to the item of merchandise. The operator acquires the sense of operation of directing the datacode to the datacode reading apparatus by training.

However, the datacode reading does not necessarily succeed when the operator directs a datacode attached to an item of merchandise to the datacode reading apparatus to read it. Even when the operator directs the datacode to the datacode reading apparatus many times, the datacode reading may fail. In such a case, the operator cannot recognize the reason why it is impossible to read the datacode.

SUMMARY

It is an object of the present invention to provide a datacode reading apparatus capable of allowing an operator to recognize the datacode reading situation, prompting him/her to change the orientation or position of the datacode to reliably read it, and causing him/her to properly recognize that the datacode is decoded.

According to a first aspect of the present invention, there is provided a datacode reading apparatus comprising: an image sensing device which senses at least a datacode and outputs moving image data; an image display unit which displays the moving image data output from the image sensing device as a real-time moving image; a decoder which decodes the datacode based on the moving image data output from the image sensing device; and a decode processing notification unit which displays the moving image data output from the image sensing device as a still image for a predetermined time from decoding of the datacode by the decoder.

According to a second aspect of the present invention, there is provided a POS system comprising: a datacode reading apparatus which reads at least a datacode attached to an item of merchandise and decodes the datacode; and a POS server which reads data of at least a price of the item of merchandise corresponding to the datacode decoded by the datacode reading apparatus, the datacode reading apparatus comprising: an image sensing device which senses at least the datacode and outputs moving image data; an image display unit which displays the moving image data output from the image sensing device as a real-time moving image; a decoder which decodes the datacode based on the moving image data output from the image sensing device; and a decode processing notification unit which displays the moving image data output from the image sensing device as a still image for a predetermined time from decoding of the datacode by the decoder, wherein the datacode reading apparatus receives the data of at least the price of the item of merchandise from the POS server, totalizes the data of prices, and displays checkout data on a display, and the POS server includes a merchandise database which stores the data of at least the price of the item of merchandise in advance, inquires of the merchandise database about the decoded data decoded by the decoder, and reads, from the merchandise database, the data of at least the price of the item of merchandise corresponding to the decoded data.

According to a third aspect of the present invention, there is provided a datacode reading method comprising steps of: causing an image sensing device to sense at least a datacode and output moving image data; displaying the moving image data output from the image sensing device on a display as a real-time moving image; causing a decoder to decode the datacode based on the moving image data output from the image sensing device; and displaying the moving image data output from the image sensing device on the display as a still image for a predetermined time from decoding of the datacode by the decoder.

DETAILED DESCRIPTION

An embodiment of the present invention will now be described with reference to the accompanying drawing.

Figure 1:
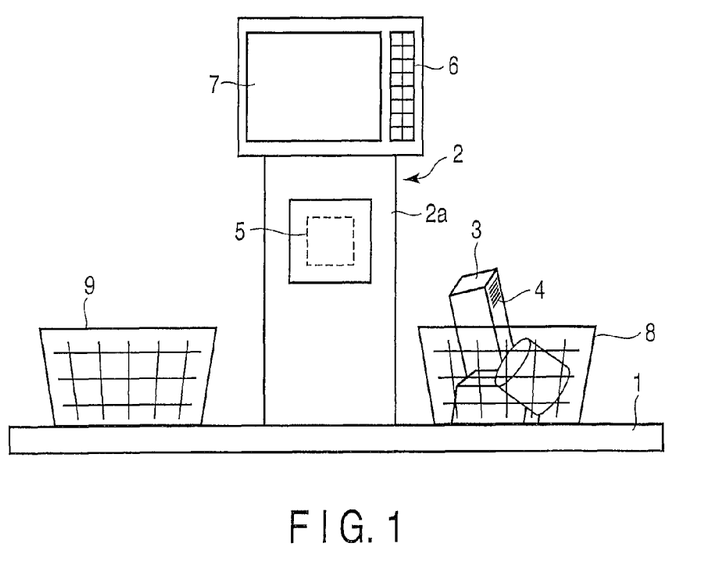
FIG. 1 is a view showing the overall arrangement of a point-of-sales system using an embodiment of a datacode reading apparatus according to the present invention.

FIG. 1 is a perspective view showing the overall arrangement of a point-of-sales (POS) system using a datacode reading apparatus. The datacode reading apparatus is installed at the checkout counter in a store such as a supermarket or a convenience store. A datacode reading apparatus 2 serving as a scanner stands at the center of a sacker table 1.

The datacode reading apparatus 2 includes an image sensing device 5. The image sensing device 5 senses a datacode 4 such as a barcode or a QR code attached to an item of merchandise 3. The datacode reading apparatus 2 also includes a keyboard 6 and a display 7. The keyboard 6 includes various keys to register the item of merchandise 3 that cannot be registered by the datacode 4 such as a barcode or a QR code. The display 7 displays the name and price of the item of merchandise 3 registered in correspondence with, e.g., a shopper.

The image sensing device 5 incorporates, e.g., a charge-coupled device (CCD) image sensor. The image sensing device 5 also incorporates an illumination device formed from, e.g., an LED. The illumination device emits illumination light to cover the image sensing area of the image sensing device 5. Hence, the image sensing device 5 senses the datacode 4 such as a barcode or a QR code attached to the item of merchandise 3 and outputs its moving image data.

The display 7 is provided above, e.g., the image sensing device 5. More specifically, a main body case 2a of the datacode reading apparatus 2 stands at the center of the sacker table 1. The image sensing device 5 is provided at the center of the main body case 2a when viewed from the front side. The image sensing device 5 is arranged at a height position to allow the operator to easily place the item of merchandise 3 held by hand in front of the image sensing device 5.

The display 7 is provided at the upper portion of the main body case 2a. The display 7 is arranged at a height position to enable the operator to easily view it. The display screen of the display 7 is directed in the same direction as the image sensing direction of the image sensing device 5.

That is, the image sensing device 5 and the display 7 are provided such that the operator can easily place the datacode 4 attached to the item of merchandise 3 in the image sensing area of the image sensing device 5. The image sensing device 5 and the display 7 are provided adjacent to each other such that the operator can easily view an image displayed on the display 7 while placing the datacode 4 attached to the item of merchandise 3 in the image sensing area of the image sensing device 5.

Note that the display 7 and the image sensing device 5 may be arranged in, e.g., the horizontal direction. The image sensing direction of the image sensing device 5 is the same as the direction of the display screen of the display 7. That is, the image sensing direction of the image sensing device 5 and the direction of the display screen of the display 7 allow the operator to execute smooth checkout of the item of merchandise 3 in front of the datacode reading apparatus.

A shopping basket 8 is placed upstream of the datacode reading apparatus 2 on the sacker table 1. The shopper will have put, e.g., the plurality of items of merchandise 3 to be bought in the shopping basket 8.

Another shopping basket 9 is placed downstream of the datacode reading apparatus 2 on the sacker table 1. The shopping basket 9 is used to receive the items of merchandise 3 after they have undergone merchandise registration. The upstream and downstream sides of the datacode reading apparatus 2 are determined depending on the direction of flow of the items of merchandise 3 in checkout.

Figure 2:
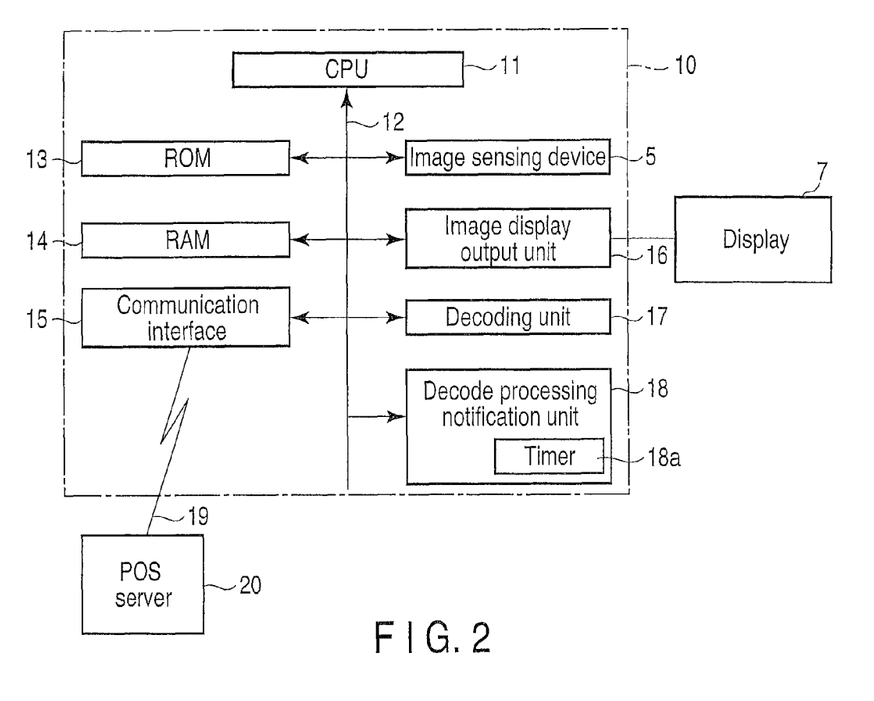
FIG. 2 is a block diagram showing the detailed arrangement of the control system of the apparatus.

FIG. 2 is a block diagram showing the detailed arrangement of a control system 10 of the apparatus. The control system 10 incorporates a central processing unit (CPU) 11 serving as a control unit main body. A read-only memory (ROM) 13, a random access memory (RAM) 14, a communication interface 15, the image sensing device 5, an image display output unit 16, a decoding unit 17, and a decode processing notification unit 18 are connected to the CPU 11 via a bus 12. A POS server 20 is connected to the communication interface 15 via a local area network (LAN) 19 in the store.

The ROM 13 stores, in advance, permanent data such as a checkout program to execute checkout of the item of merchandise 3. The RAM 14 temporarily stores various kinds of data such as image data acquired upon image sensing of the image sensing device 5 and decoded data as a result of decoding the datacode 4 attached to the item of merchandise 3. A work area to store various kinds of data is formed in the RAM 14.

The image display output unit 16 receives moving image data output from the image sensing device 5, processes the moving image data, and displays it on the display screen of the display 7 as a real-time moving image. The display 7 displays the name and price of the item of merchandise 3 registered in correspondence with the shopper. Hence, the image display output unit 16 divides the display screen of the display 7 and displays the real-time moving image on one of the divided screens and the name and price of the item of merchandise 3 on the other divided screen. That is, the display 7 displays both the real-time moving image and the name and price of the item of merchandise 3.

Alternatively, two displays 7 may be prepared to display the real-time moving image on one display 7 and the name and price of the item of merchandise 3 on the other display 7. The real-time moving image and the name and price of the item of merchandise 3 may be displayed on the display screen of one display 7 in a superimposed manner.

The decoding unit 17 recognizes, in the moving image data output from the image sensing device 5, e.g., one frame data that enables reading of the entire datacode 4. The decoding unit 17 identifies the datacode 4 from the recognized frame data. The decoding unit 17 decodes the identified datacode 4 into, e.g., a character code and outputs it as decoded data.

The decode processing notification unit 18 extracts one frame data when the decoding unit 17 has decoded the datacode 4 in the moving image data output from the image sensing device 5 during a predetermined time of, e.g., 500 ms from the start of decoding of the datacode 4 by the decoding unit 17. The decode processing notification unit 18 displays the extracted frame data on the display screen of the display 7 as a still image.

The decode processing notification unit 18 includes an elapsed time measuring timer 18a. The elapsed time measuring timer 18a measures a predetermined time of, e.g., 500 ms from the start of decoding of the datacode 4 by the decoding unit 17.

When the datacode 4 of the same code is decoded while the still image is displayed on the display screen of the display 7 for a predetermined time, the decode processing notification unit 18 stops outputting the datacode 4.

When, for example, the operator removes the next item of merchandise 3 from the shopping basket 8, and the decoding unit 17 decodes the datacode 4 of a different code attached to the item of merchandise 3 while the still image is displayed on the display screen of the display 7 for a predetermined time, the decode processing notification unit 18 performs the following processing.

The decode processing notification unit 18 extracts, e.g., one frame data when the decoding unit 17 has decoded the datacode 4 in the moving image data output from the image sensing device 5 during a predetermined time of, e.g., 500 ms from the start of decoding of the datacode 4 of the next item of merchandise 3, as described above. The decode processing notification unit 18 displays the extracted frame data on the display screen of the display 7 as a still image.

After the decode processing notification unit 18 has displayed the still image on the display screen of the display 7 for a predetermined time, the image display output unit 16 operates again to restore display of the real-time moving image.

The decode processing notification unit 18 displays, on the display screen of the display 7, not only the still image but also the price and name of the item of merchandise 3 or checkout data representing the sum of the prices of all items of merchandise 3, which is transmitted from the POS server 20.

In this case, the decode processing notification unit 18 divides the display screen of the display 7 into display areas and displays the still image on one display area and the data of the price and name of the item of merchandise 3 on the other display area. The decode processing notification unit 18 may display the still image and the data of the price and name of the item of merchandise 3 on the single display screen of the display 7 in a superimposed manner. Alternatively, another display 7 may be provided independently of the display 7 so that the decode processing notification unit 18 displays the still image on the display 7 and the data of the price and name of the item of merchandise 3 on the other display.

The POS server 20 transmits/receives information about checkout processing of the item of merchandise 3 to/from the control system 10 of the datacode reading apparatus, and records the checkout processing result of the item of merchandise 3. The POS server 20 has a merchandise database which stores, e.g., the data of the prices and names of all items of merchandise 3 on sale in the store in advance.

The POS server 20 inquires of a merchandise database 20a about the decoded data of the datacode 4 of the item of merchandise 3, which is transmitted from the control system 10 of the datacode reading apparatus via the LAN 19. The POS server 20 reads, from the merchandise database 20a, the data of the price and name of the item of merchandise 3 corresponding to the decoded data of inquiry. The POS server 20 totalizes the prices of all items of merchandise 3 read from the merchandise database 20a to obtain checkout data, and returns the checkout data to the control system 10 of the datacode reading apparatus via the LAN 19.

Figure 3:
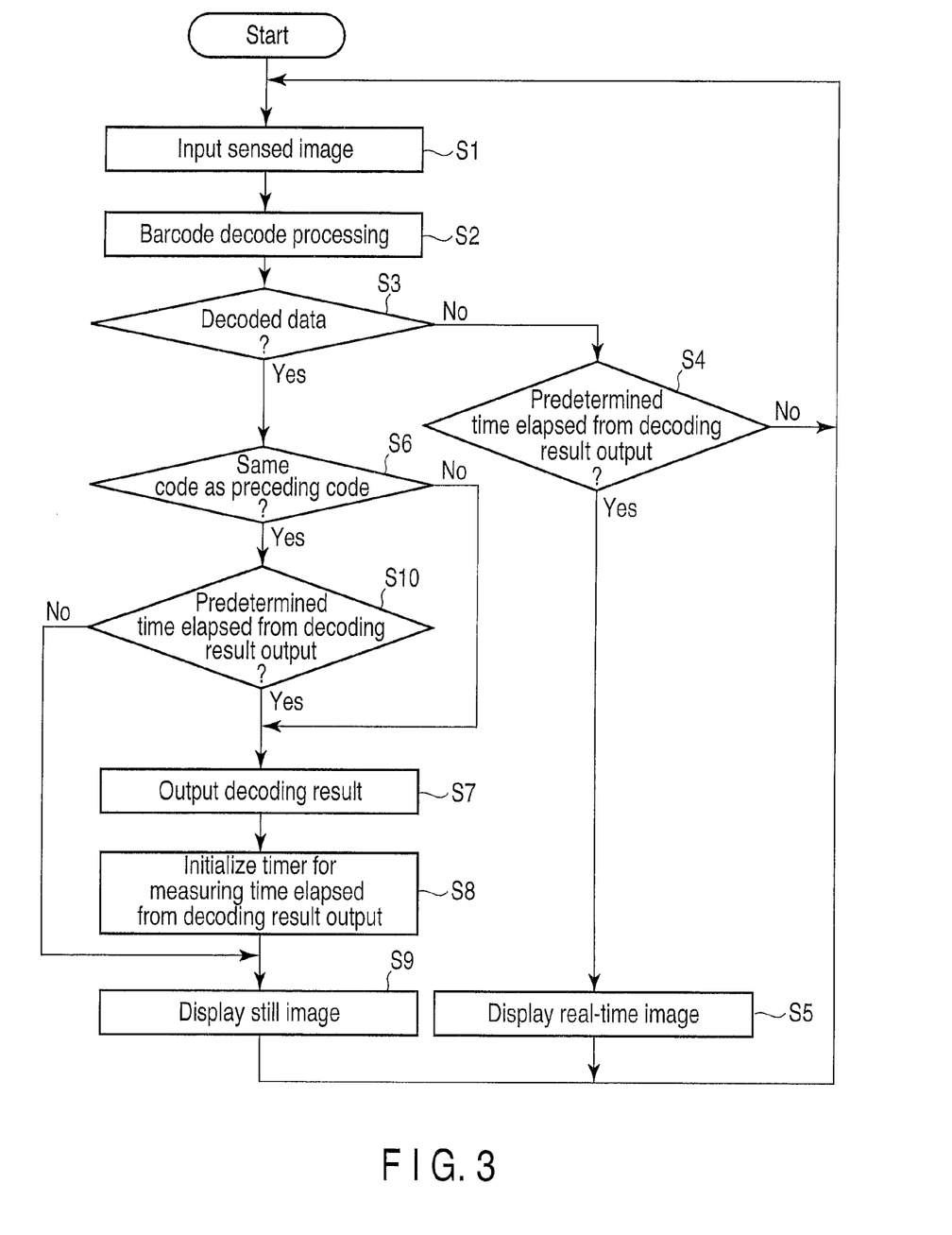
FIG. 3 is a flowchart of datacode reading by the apparatus.

The checkout operation of the apparatus having the above-described arrangement will be described next with reference to the datacode reading flowchart shown in FIG. 3.

The operator removes the items of merchandise 3 from the shopping basket 8 one by one. The operator places the datacode 4 attached to the item of merchandise 3 in the image sensing area of the image sensing device 5 so that the image sensing device 5 senses the datacode 4 attached to the item of merchandise 3.

In step S1, the image sensing device 5 always performs the image sensing operation and outputs moving image data. When the item of merchandise 3 and the datacode 4 attached to it enter the image sensing area of the image sensing device 5, the image sensing device 5 senses the item of merchandise 3 and the datacode 4 attached to it and outputs moving image data.

In step S2, the decoding unit 17 recognizes, in the moving image data output from the image sensing device 5, e.g., one frame data that enables reading of the entire datacode 4. The decoding unit 17 identifies the datacode 4 from the recognized frame data. The decoding unit 17 decodes the identified datacode 4 into, e.g., a character code and outputs it as decoded data.

The decoding unit 17 identifies the datacode 4 from the frame data and decodes the datacode 4 in the above-described way. However, for example, the datacode 4 may be out of the image sensing area of the image sensing device 5. Alternatively, the datacode 4 may be out of the image sensing area of the image sensing device 5 and be excessively tilted with respect to the image sensing direction of the image sensing device 5. In this case, the CPU 11 determines in step S3 that the datacode 4 does not exist in the moving image data output from the image sensing device 5.

When it is determined that the datacode 4 does not exist, the CPU 11 advances to step S4 to determine whether the elapsed time measuring timer 18a has measured a predetermined time of, e.g., 500 ms after the decoding unit 17 has decoded the datacode 4 attached to the item of merchandise 3 immediately precedingly removed from the shopping basket 8 by the operator.

If it is determined that the predetermined time of, e.g., 500 ms has elapsed from decoding of the datacode 4, as described above, the CPU 11 advances to step S5 to operate the image display output unit 16.

Figure 4:
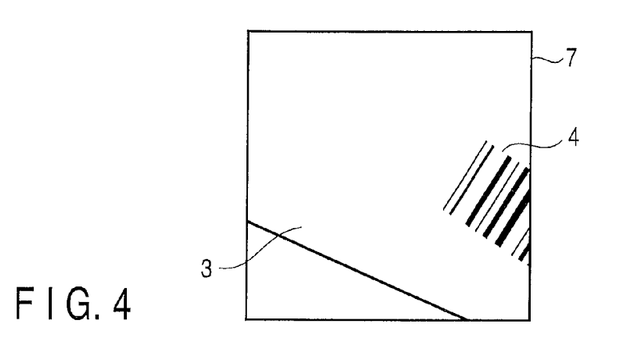
FIG. 4 is a view showing a state in which a datacode which is displayed in real time on the display screen of the display of the apparatus is out of the image sensing area of the image sensing device.
Figure 5:
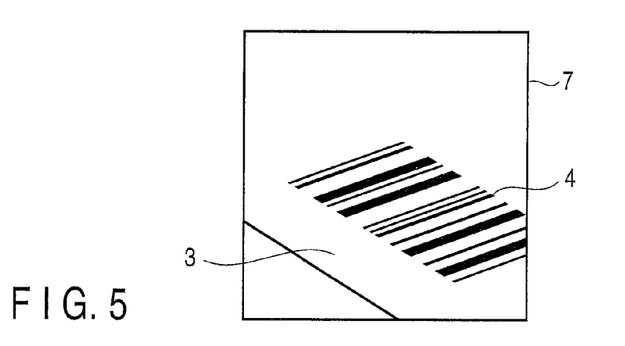
FIG. 5 is a view showing a state in which a datacode which is displayed in real time on the display screen of the display of the apparatus is out of the image sensing area of the image sensing device and is excessively tilted.

The image display output unit 16 receives moving image data output from the image sensing device 5, processes the moving image data, and displays it on the display screen of the display 7 as a real-time moving image. FIGS. 4 and 5 show examples of the instantaneous image of one scene in the moving image which is displayed in real time on the display screen of the display 7. FIG. 4 shows a state in which the datacode 4 is out of the image sensing area of the image sensing device 5. FIG. 5 shows a state in which the datacode 4 is out of the image sensing area of the image sensing device 5 and is excessively tilted with respect to the image sensing direction of the image sensing device 5. In addition, an image of the datacode 4 which is attached to the item of merchandise 3 and directed to the image sensing area of the image sensing device 5 by the operator is displayed in real time on the display screen of the display 7 as a moving image.

When the datacode 4 is out of the image sensing area of the image sensing device 5 or is excessively tilted with respect to the image sensing device 5, as described above, the decoding unit 17 cannot read the entire datacode 4 in, e.g., the moving image data output from the image sensing device 5.

Note that when the surface of the item of merchandise 3 having the datacode 4 almost perpendicularly faces the image sensing area of the image sensing device 5, and the entire datacode 4 falls within the image sensing area of the image sensing device 5, the decoding unit 17 can decode the datacode 4. Even when the datacode 4 rotates, the decoding unit 17 can decode the datacode 4 as long as the surface of the item of merchandise 3 having the datacode 4 almost perpendicularly faces the image sensing area of the image sensing device 5.

However, if the surface of the item of merchandise 3 having the datacode 4 tilts with respect to the image sensing direction of the image sensing device 5, and the tilt angle is equal to or more than a predetermined tilt angle, the decoding unit 17 cannot decode the datacode 4.

In this state, the operator views the display screen of the display 7 to recognize that the entire datacode 4 cannot be read. That is, the operator views the state when the datacode 4 displayed on the display screen of the display 7 in real time is directed to the image sensing area of the image sensing device 5. Hence, the operator can recognize in real time the position and orientation of the datacode 4 directed to the image sensing area of the image sensing device 5.

The operator can recognize the reason why it is impossible to read the entire datacode 4. For example, the datacode 4 is out of the image sensing area of the image sensing device 5, as shown in FIG. 4. Alternatively, the datacode 4 is out of the image sensing area of the image sensing device 5 and is excessively tilted with respect to the image sensing area of the image sensing device 5, as shown in FIG. 5. The operator can immediately recognize the state.

Recognizing that the datacode 4 attached to the item of merchandise 3 is directed to the image sensing area of the image sensing device 5, the operator can change the position and orientation of the item of merchandise 3 to read the entire datacode 4.

Figure 6:
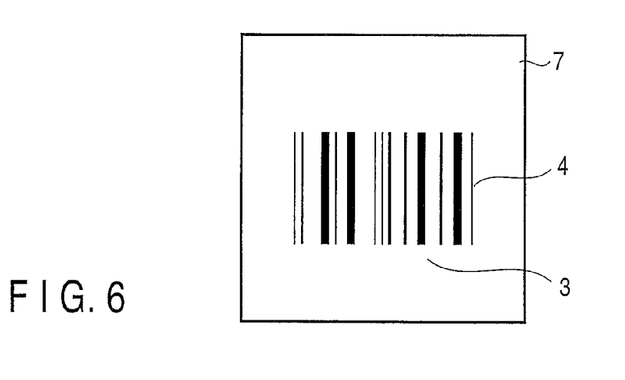
FIG. 6 is a view showing a state in which a datacode which is displayed in real time on the display screen of the display of the apparatus completely falls within the image sensing area of the image sensing device and faces the image sensing area of the image sensing device.

Consequently, the operator can place the entire datacode 4 in the image sensing area of the image sensing device 5, as shown in FIG. 6. The operator can direct the datacode 4 attached to the item of merchandise 3 to the image sensing area of the image sensing device 5 such that it almost perpendicularly faces the image sensing area of the image sensing device 5.

Note that the image sensing device 5 always performs the image sensing operation and outputs moving image data in step S1. For this reason, the image display output unit 16 continuously processes the moving image data output from the image sensing device 5 and displays it on the display screen of the display 7 as a real-time moving image.

In the above-described way, the datacode 4 is directed to the image sensing area of the image sensing device 5 such that the entire datacode 4 falls within the image sensing area of the image sensing device 5 and perpendicularly faces the image sensing area of the image sensing device 5. In step S2, the decoding unit 17 recognizes, in the moving image data output from the image sensing device 5, e.g., one frame data that enables reading of the entire datacode 4. The decoding unit 17 identifies the datacode 4 from the recognized frame data. The decoding unit 17 decodes the identified datacode 4 into, e.g., a character code and outputs it as decoded data.

In step S6, the CPU 11 determines whether the decoded data of the datacode 4 currently decoded by the decoding unit 17 is the same as the decoded data of the datacode 4 attached to the item of merchandise 3 immediately precedingly removed from the shopping basket 8 by the operator.

If it is determined that the decoded data of the current datacode 4 is different from the decoded data of the preceding datacode 4, the CPU 11 advances to step S7 to transmit the decoded data of the datacode 4 currently decoded by the decoding unit 17 from the communication interface 15 to the POS server 20 via the LAN 19.

The POS server 20 inquires of the merchandise database 20a about the decoded data of the datacode 4 of the item of merchandise 3, which is transmitted from the control system 10 of the datacode reading apparatus via the LAN 19. The POS server 20 reads, from the merchandise database 20a, the data of the price and name of the item of merchandise 3 corresponding to the decoded data of inquiry. The POS server 20 totalizes the prices of all items of merchandise 3 inquired of the merchandise database 20a to obtain checkout data, and returns the checkout data to the control system 10 of the datacode reading apparatus via the LAN 19.

The CPU 11 receives the checkout data representing the sum of the prices of all items of merchandise 3, which is returned to the control system 10, via the communication interface 15. The decode processing notification unit 18 displays, on the display screen of the display 7, not only the still image but also the price and name of the item of merchandise 3 or checkout data representing the sum of the prices of all items of merchandise 3, which is transmitted from the POS server 20.

In this case, the decode processing notification unit 18 divides the display screen of the display 7 into display areas and displays the still image on one display area and the data of the price and name of the item of merchandise 3 on the other display area. The decode processing notification unit 18 may display the still image and the data of the price and name of the item of merchandise 3 on the single display screen of the display 7 in a superimposed manner. Alternatively, another display 7 may be provided independently of the display 7 so that the decode processing notification unit 18 displays the still image on the display 7 and the data of the price and name of the item of merchandise 3 on the other display.

As described above, the decode processing notification unit 18 displays, on the display screen of the display 7, not only the still image but also the price and name of the item of merchandise 3 or checkout data representing the sum of the prices of all items of merchandise 3, which is transmitted from the POS server 20. At this time, the decode processing notification unit 18 may generate, e.g., a high-pitched tone from a speaker to notify the operator of display of the price and name of each item of merchandise 3 or checkout data representing the sum of the prices of all items of merchandise 3.

In step S8, the decode processing notification unit 18 initializes the elapsed time measuring timer 18a to start measurement again when transmitting the decoded data of the datacode 4 to the POS server 20.

In step S9, the decode processing notification unit 18 extracts one frame data when the decoding unit 17 has decoded the datacode 4 in the moving image data output from the image sensing device 5. The decode processing notification unit 18 displays the extracted frame data on the display screen of the display 7 as a still image.

For example, FIG. 6 shows an image obtained by sensing the datacode 4 when decoding it. FIG. 6 shows a state in which the datacode 4 attached to the item of merchandise 3 is directed to the image sensing area of the image sensing device 5 such that the datacode 4 completely falls within the image sensing area of the image sensing device 5 and almost perpendicularly faces the image sensing area of the image sensing device 5. In this state, the decode processing notification unit 18 displays the image of the datacode 4 as shown in FIG. 6 on the display screen of the display 7 as a still image.

While the still image of the datacode 4 is being displayed on the display screen of the display 7, the decode processing notification unit 18 returns to step S6 again via steps S1 to S3. In step S6, the decode processing notification unit 18 determines whether the decoded data of the datacode 4 currently decoded by the decoding unit 17 is the same as the decoded data of the datacode 4 attached to the item of merchandise 3 immediately precedingly removed from the shopping basket 8 by the operator.

At this time, the operator is continuously placing, in the image sensing area of the image sensing device 5, the datacode 4 attached to the item of merchandise 3 removed from the shopping basket 8. Alternatively, the operator has recognized that the datacode 4 attached to the item of merchandise 3 is decoded and moved the datacode 4 attached to the item of merchandise 3 out of the image sensing area of the image sensing device 5.

Hence, the decode processing notification unit 18 determines that the decoded data of the datacode 4 currently decoded by the decoding unit 17 is the same as the decoded data of the datacode 4 immediately precedingly removed from the shopping basket 8 by the operator, or that the datacode 4 does not exist.

As a result of the determination, the decode processing notification unit 18 advances from step S6 to step S10 to determine whether the elapsed time measuring timer 18a has measured a predetermined time of, e.g., 500 ms from decoding by the decoding unit 17. If it is determined that the predetermined time of, e.g., 500 ms has not elapsed from decoding by the decoding unit 17, the decode processing notification unit 18 advances to step S9 to continuously display the still image of the datacode 4 as shown in FIG. 6 on the display screen of the display 7.

When the still image of the datacode 4 is continuously displayed on the display screen of the display 7, and the predetermined time of, e.g., 500 ms has elapsed from decoding by the decoding unit 17, the operator recognizes that, e.g., the datacode 4 attached to the item of merchandise 3 has been decoded. The operator moves the datacode 4 attached to the item of merchandise 3 out of the image sensing area of the image sensing device 5.

In this state, the decode processing notification unit 18 returns to step S5 via steps S3 and S4 to operate the image display output unit 16. The image display output unit 16 receives moving image data output from the image sensing device 5 again, processes the moving image data, and displays it on the display screen of the display 7 as a real-time moving image.

Note that the CPU 11 determines in step S6 whether the decoded data of the datacode 4 currently decoded by the decoding unit 17 is the same as the decoded data of the datacode 4 attached to the item of merchandise 3 immediately precedingly removed from the shopping basket 8 by the operator.

In this case, after the elapsed time measuring timer 18a of the decode processing notification unit 18 has measured the predetermined time of, e.g., 500 ms from decoding by the decoding unit 17, the decoded data of the datacode 4 currently decoded by the decoding unit 17 may be the same as the decoded data of the datacode 4 precedingly decoded by the decoding unit 17. Even in this case, the decode processing notification unit 18 receives the decoded data of the datacode 4 currently decoded by the decoding unit 17. Simultaneously, in step S7, the CPU 11 transmits the decoded data of the datacode 4 currently decoded by the decoding unit 17 from the communication interface 15 to the POS server 20 via the LAN 19.

The decoded data of the current datacode 4 is the same as that of the preceding datacode 4 when the shopper is going to buy, e.g., two identical items of merchandise 3, and the operator places the identical items of merchandise 3 in the image sensing area of the image sensing device 5 with a time lag of, e.g., 500 ms.

According to the above-described embodiment, the image display output unit 16 processes moving image data output from the image sensing device 5 and displays it on the display screen of the display 7 as a real-time moving image. For a predetermined time from decoding of the datacode 4 by the decoding unit 17, the decode processing notification unit 18 displays the moving image data output from the image sensing device 5 on the display screen of the display 7 as a still image. Hence, the operator can recognize in real time the position and orientation of the datacode 4 directed to the image sensing area of the image sensing device 5 and also recognize that the datacode 4 attached to the item of merchandise 3 has been decoded by viewing the display screen of the display 7.

The decode processing notification unit 18 displays, on the display screen of the display 7, not only the still image but also the price and name of the item of merchandise 3 or checkout data representing the sum of the prices of all items of merchandise 3, which is transmitted from the POS server 20. The operator can easily recognize the price and name of the item of merchandise 3 or the checkout data representing the sum of the prices of all items of merchandise 3 by viewing the display screen of the display 7.

The image sensing device 5 and the display 7 are provided adjacent to each other. The display 7 is provided, e.g., above the image sensing device 5. The operator can easily place the datacode 4 attached to the item of merchandise 3 in the image sensing area of the image sensing device 5. The operator can easily view an image displayed on the display 7 while placing the datacode 4 attached to the item of merchandise 3 in the image sensing area of the image sensing device 5. This allows the operator to easily recognize that the datacode 4 attached to the item of merchandise 3 has been decoded and also the price and name of the item of merchandise 3 or checkout data representing the sum of the prices of all items of merchandise 3 by viewing the still image displayed on the display screen of the display 7.

Moving image data output from the image sensing device 5 is processed and displayed on the display screen of the display 7 as a real-time moving image. For example, the datacode 4 is out of the image sensing area of the image sensing device 5, as shown in FIG. 4. Alternatively, the datacode 4 is out of the image sensing area of the image sensing device 5 and is excessively tilted with respect to the image sensing area of the image sensing device 5, as shown in FIG. 5. Even in this state, the operator can immediately place the entire datacode 4 in the image sensing area of the image sensing device 5, as shown in FIG. 6. The operator can direct the datacode 4 attached to the item of merchandise 3 to the image sensing area of the image sensing device 5 so that it almost perpendicularly faces the image sensing area of the image sensing device 5. This increases the efficiency of checkout of the item of merchandise 3.

The operator can immediately recognize that the entire datacode 4 cannot be read because the datacode 4 is out of the image sensing area of the image sensing device 5, as shown in FIG. 4, or the datacode 4 is out of the image sensing area of the image sensing device 5 and is excessively tilted with respect to the image sensing area of the image sensing device 5, as shown in FIG. 5.

Hence, recognizing that the datacode 4 attached to the item of merchandise 3 is directed to the image sensing area of the image sensing device 5, the operator can properly change the position and orientation of the item of merchandise 3 to read the entire datacode 4. As a result, the operator can place the entire datacode 4 in the image sensing area of the image sensing device 5, as shown in FIG. 6, and direct the datacode 4 attached to the item of merchandise 3 to the image sensing area of the image sensing device 5 such that it almost perpendicularly faces the image sensing area of the image sensing device 5. It is therefore possible to prevent any situation that when the operator directs the datacode 4 attached to the item of merchandise 3 to the datacode reading apparatus to read it, reading of the datacode 4 fails, and the reading operation of the datacode 4 needs to be performed many times.

Note that a self POS system is used to check out the item of merchandise 3. The self POS system requires no operator at a checkout counter in a store. In the self POS system, each shopper himself/herself places the datacode 4 attached to the item of merchandise 3 in the image sensing area of the image sensing device 5 to check out the item of merchandise 3.

The shopper is unaccustomed to checkout of the item of merchandise 3 by placing the datacode 4 attached to the item of merchandise 3 in the image sensing area of the image sensing device 5.

The datacode reading apparatus 2 is provided in the self POS system. Even in the self POS system, moving image data output from the image sensing device 5 is input so that the image display output unit 16 processes the moving image data and displays it on the display screen of the display 7 as a real-time moving image.

The shopper who uses the self POS system can recognize in real time the position and orientation of the datacode 4 directed to the image sensing area of the image sensing device 5 by viewing the display screen of the display 7. For example, the shopper can place the entire datacode 4 in the image sensing area of the image sensing device 5, as shown in FIG. 6. The shopper can also direct the datacode 4 attached to the item of merchandise 3 to the image sensing area of the image sensing device 5 such that it almost perpendicularly faces the image sensing area of the image sensing device 5.

This allows even the shopper, who is unaccustomed to checkout of the item of merchandise 3 by placing the datacode 4 attached to the item of merchandise 3 in the image sensing area of the image sensing device 5, to smoothly execute checkout of the item of merchandise 3 by himself/herself in the self POS system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A datacode reading apparatus comprising:
    an image sensing device which senses at least a datacode and outputs moving image data;
    a display;
    an image display unit which displays the moving image data output from the image sensing device on the display as a real-time moving image;
    a decoder which recognizes frame data that enables reading of all the datacode from moving image data output from the image sensing device and decodes the datacode from the recognized frame data; and
    a decode processing notification unit which displays the frame data recognized when the datacode is decoded by the decoder on the display as a still image for a predetermined time from decoding of the datacode by the decoder.

2. The datacode reading apparatus according to claim 1, wherein the decode processing notification unit displays not only the still image but also information on an item of merchandise based on a decoding result of the datacode by the decoder.

3. The datacode reading apparatus according to claim 2, wherein the decode processing notification unit displays the still image and the information of the item of merchandise based on the decoding result of the datacode on different display areas of a single display screen, on a single display screen in a superimposed manner, or on different display screens.

4. The datacode reading apparatus according to claim 1, wherein when the datacode of the same code is decoded again while the still image is being displayed for the predetermined time, the decode processing notification unit stops outputting the datacode.

5. The datacode reading apparatus according to claim 1, wherein when the datacode of a different code is decoded while the still image is being displayed for the predetermined time, the decode processing notification unit displays, as the still image, the moving image data output from the image sensing device for a predetermined time from decoding of the datacode of the different code.

6. The datacode reading apparatus according to claim 1, wherein after the still image is displayed for the predetermined time, the decode processing notification unit operates the image display unit again to restore display of the real-time moving image.

7. The datacode reading apparatus according to claim 1, wherein the image sensing device and the image display unit are provided adjacent to each other.

8. The datacode reading apparatus according to claim 1, wherein an image sensing direction of the image sensing device is the same as a direction of a display screen of the image display unit.

9. A POS system comprising:
    a datacode reading apparatus which reads at least a datacode attached to an item of merchandise and decodes the datacode; and
    a POS server which reads data of at least a price of the item of merchandise corresponding to the datacode decoded by the datacode reading apparatus,
    the datacode reading apparatus comprising:
        an image sensing device which senses at least the datacode and outputs moving image data;
        a display;
        an image display unit which displays the moving image data output from the image sensing device on the display as a real-time moving image;
        a decoder which recognizes frame data that enables reading of all the datacode from the moving image data output from the image sensing device and decodes the datacode from the recognized frame data; and
        a decode processing notification unit which displays the frame data recognized when the datacode is decoded by the decoder on the display as a still image for a predetermined time from decoding of the datacode by the decoder,
    wherein the datacode reading apparatus receives the data of at least the price of the item of merchandise from the POS server, totalizes the data of prices, and displays checkout data on a display, and
    the POS server includes a merchandise database which stores the data of at least the price of the item of merchandise in advance, inquires of the merchandise database about the decoded data decoded by the decoder, and reads, from the merchandise database, the data of at least the price of the item of merchandise corresponding to the decoded data.

10. The POS system according to claim 9, wherein the decode processing notification unit displays not only the still image but also information on an item of 5 merchandise based on a decoding result of the datacode by the decoder.

11. The POS system according to claim 10, wherein the decode processing notification unit displays the still image and the information of the item of 10 merchandise based on the decoding result of the datacode on different display areas of a single display screen, on a single display screen in a superimposed manner, or on different display screens.

12. The POS system according to claim 9, wherein when the datacode of the same code is decoded again while the still image is being displayed for the predetermined time, the decode processing notification unit stops outputting the datacode.

13. The POS system according to claim 9, wherein when the datacode of a different code is decoded while the still image is being displayed for the predetermined time, the decode processing notification unit displays, as the still image, the moving image data output from the image sensing device for a predetermined time from decoding of the datacode of the different code.

14. The POS system according to claim 9, wherein after the still image is displayed for the predetermined time, the decode processing notification unit operates the image display unit again to restore display of the real-time moving image.

15. The POS system according to claim 9, wherein the image sensing device and the image display unit are provided adjacent to each other.

16. The POS system according to claim 9, wherein an image sensing direction of the image sensing device is the same as a direction of a display screen of the image display unit.

17. A datacode reading method comprising steps of:
causing an image sensing device to sense at least a datacode and output moving image data;
displaying the moving image data output from the image sensing device on a display as a real-time moving image;
causing a decoder to decode the datacode based on the moving image data output from the image sensing device; and
displaying the moving image data output from the image sensing device on the display as a still image for a predetermined time from decoding of the datacode by the decoder.

* * * * *